Patented May 7, 1940

2,199,695

UNITED STATES PATENT OFFICE 2,199,695

ANHYDROUS LUBRICANT

Marcellus T. Flaxman, Wilmington, Calif., assignor to Union Oil Company of California, Los Angeles, Calif., a corporation of California No Drawing. Application August 20, 1938,
Serial No. 225,937

6 Claims. (Cl. 87—9)

This invention relates to greases adapted for use as lubricants for the water proofing and lubrication of cordage, such as hemp rope, the life of which is thereby prolonged. This case is a continuation in part of my co-pending application, Serial No. 48,110 now Patent No. 2,130,540. An object of the present invention is to produce a cordage lubricant which will be stable in use and from which the soap will not separate.

I have discovered that by employing animal fatty acids (or vegetable fatty acids) containing a minimum of glycerides, of which tallow fatty acids are good examples, in combination with another fat exemplified by wool fat now frequently referred to as "degras", these fatty materials are retained in solution in grease consisting of lubricating oil and water-resistant or non-emulsifying soaps such as calcium soaps. The function of the unsaponified animal fatty acids is largely to retain the soap in the mineral lubricating oil, as well as to increase the penetration of the grease into the fibers, although it also has in itself some lubricating and preservative properties. The function of the wool fat or degras is to assist the unsaponified animal fatty acids in retaining the soap and to insure against separation of the soap.

Briefly the present invention resides in a lubricating composition or grease containing relatively large proportions of petroleum fractions such as mineral lubricating oil, with or without considerable proportions of petrolatum, and a considerable proportion of a non-emulsifying soap such as calcium soap, or barium soap, a considerable proportion of unsaponified animal fatty acids, and a relatively small proportion of wool fat which has the property of assisting said unsaponified fat in holding the soap in solution in the petroleum fractions and prevents separation or precipitation of the soap. The invention further resides in such a composition wherein the petroleum fractions represent about three-fourths of the lubricant, and also wherein such petroleum fractions are in the form of approximately equal proportions of a mineral lubricating oil of appropriate viscosity and petrolatum or paraffin wax, preferably petrolatum.

In preparing lubricants according to this invention, the animal fatty acids selected are those fatty acids which are substantially free from glycerides or other constituents or other non-fatty acid constituents, such as tallow fatty acids or materials which may be purchased upon the market under designation of "animal fatty acids". These may be chiefly stearic and palmitic acids and may contain some oleic acid. Also vegetable fatty acids which are substantially free from glycerides or other non-acid materials, may be included within the fatty acids here employed.

A suitable formula for a cordage grease according to this invention is as follows:

| | |
|---|---|
| Calcium soap of animal fatty acids | About 12% to 14% by weight |
| Animal fatty acids | About 8% to 10% |
| Petrolatum | About 35% |
| Western lubricating oil of 100 seconds Saybolt Universal, viscosity at 100° F. | About 35% |
| Wool fat or wool grease containing a small proportion of fatty acid, for example around 15% to 30% fatty acid | About 4% |

While the wool fat may be varied somewhat, for example between about 3% and 6%, nevertheless 4% is a practical optimum. Much less than 4% does not sufficiently assist the holding functions of the fatty acid, and any great increase over 4% offers little practical additional benefit and merely increases cost. As to the percentage of fatty acids, that is the animal or vegetable fatty acids mentioned, about 8% to 9%, is ordinarily preferable but the range given permits useful variation. As to the soap, the calcium soap of animal fatty acids being preferred the 12% to 14% indicated is a preferred range, but the content may be varied from about 10% to about 20% of the total, at least for some uses. As to the petrolatum (or paraffin wax) and lubricating oil, these also may be varied somewhat. For example, the total may be made to exceed 75% so long as a sufficiently grease-like consistency is maintained. Probably, however, not much over 80% would be practical. Similarly, not much less than 65% would be useful inasmuch as the grease structure would become too heavy unless the petrolatum or paraffin content be considerably reduced and substituted with lubricating oil. For example, it would be possible to eliminate all petrolatum or paraffin wax and use only oil. In this instance a considerably heavier lubricating oil would be preferable, for example one having 200 seconds Saybolt Universal viscosity at 100° F. However, a minimum petrolatum content of 10% to 15% with oil to bring the combined petroleum fractions up to 65% to 80%, is preferred.

Attention is called to the fact that the animal or vegetable fatty acids described do not perform the function performed by the wool fat. Just what characteristic there is in the wool fat which renders it so desirable for the present purpose is not clear; perhaps, it is the cholesterol content or other higher alcohols which may be present. Similarly, ordinary fats are not equivalents. This means that fatty acids and glycerides will not perform the function performed by the wool fat.

Aside from the percentage of wool fat whose range has been indicated above, the content of the other materials and the viscosity of the mineral oil employed must be gauged to produce a commercially acceptable product. Otherwise the limits of the ranges of the constituents are controlled by the necessity of preventing soap separation. Thus, a considerable quantity of the unsaponified fatty acids must be present to prevent separation of the soap from the mineral oil. Again, if the soap content is reduced below about 10%, the lubricating properties of the grease are too greatly reduced, and on the other hand, if the soap content runs much above 25%, the treated rope will probably become too sticky. Within the limits of these requirements of consistency and other characteristics, the proportions of petrolatum to mineral oil may be varied, even to the elimination of either. Obviously smaller proportions of petrolatum or paraffin wax results in increase of fluidity for any given viscosity of mineral lubricating oil. Substitutes for the calcium soap are aluminum and barium soaps. While soaps of the same fatty acids as are separately added to the composition are preferred, nevertheless soaps of other fatty materials may be employed, such as cottonseed oil soaps. These soaps are conducive to the production of anhydrous, non-emulsifying or water-resistant greases, which condition is necessary for the water proofing and lubricating of cordage to which this invention is particularly adapted.

In preparing a substantially anhydrous calcium soap according to this invention, a quantity of hydrated lime is added to the fatty material to be saponified together with the petrolatum and mineral oil to be used in amount calculated to yield the desired percentage of calcium soap. Also, the desired amount of unsaponified animal or vegetable fatty acid is added. The mixture is then heated until saponification is complete and the lime has been neutralized. The temperature is eventually carried to about 300° F. whereby both saponification and substantially complete dehydration are brought about. At this stage the wool fat is added with agitation, the mixture gradually cooled to about 100° F. over a period of several hours and finally drawn into containers at 100° F. The water content is ordinarily thus reduced to less than about 1%. However, depending upon the use to which the grease is eventually to be put, the water content might be slightly higher, for example 2% or a limit of 3%. Also, low water contents avoid foaming under conditions of application and avoid change in the consistency of the material at the temperatures to which it is held during the process of application to cordage.

As a specific example for the preparation of a grease according to this invention, the following procedure was employed to produce a batch of about 4000 pounds. For this purpose, about 1200 pounds of Western mineral lubricating oil of 100 seconds Saybolt Universal at 100° F., about 800 pounds of amber petrolatum, 65 pounds of hydrated lime, 20 pounds of water, and about 780 pounds of tallow fatty acids were all placed in a steam kettle, and were heated therein by turning steam into the jacket of the kettle. This heating raised the temperature to about 250°–300° F., the mixture in the kettle being constantly maintained in a state of agitation as by using a paddle. While maintaining the agitation, the mass was then held at the above temperature for a period of several hours to complete the dehydration of the mass and to cause the saponification of the ingredients by the lime. After all of the lime was consumed in the formation of the calcium soap of the tallow fatty acids, 160 pounds of commercial degras or wool fat and 1000 pounds of the above lubricating oil were added and mixed by agitation. Thereafter, while maintaining the agitation, the temperature was allowed to drop in a period of about three hours or less, to about 90° F., whereupon the product was drawn off, allowed to stand, and then packaged.

A grease of the character produced by this procedure and containing about 1% water, is a semisolid at normal temperatures, that is from about 60° F. to 90° F., but is fluid at 150° F. to 175° F. which is the average temperature for application to the goods. The grease may be held within this temperature range over an extended period of time without exhibiting any tendency to separate into phases. This characteristic will demonstrate the effectiveness of the wool fat as a holding agent to prevent separation of the soap.

It is to be understood that various modifications may be made by those skilled in the art, and that, therefore, the above disclosures are to that extent given as illustrative of a preferred form of the invention.

I claim:

1. A lubricant comprising at least about 50% of petroleum lubricating fractions at least as heavy as light lubricating oils, a quantity of unsaponified saponifiable fatty acids approximating about one-tenth of the composition, between about 10% and 25% of a soap to produce a non-emulsifying grease, and a small proportion in the order of a few percent of a normally solid fatty material in the form of wool fat to insure retention of the soap.

2. An anhydrous lubricant comprising between about two-fifths and four-fifths of petroleum lubricating fractions, a quantity of unsaponified saponifiable fatty acids approximating about one-tenth of the composition, between about 10% and 25% of soap producing a non-emulsifying grease and a small proportion in the order of 4% of normally solid fatty material in the form of wool fat having the ability to insure retention of the soap in the oil.

3. A lubricant according to claim 2 wherein the water content is below about 1%.

4. A lubricant according to claim 2 in which the petroleum lubricating fractions comprise petroleum lubricating oil and petrolatum, the petrolatum constituting from about one-fifth to two-fifths of the total composition.

5. A lubricant according to claim 2 wherein the unsaponified fatty acids are substantially free from glycerides and other non-acid constituents.

6. A lubricant comprising lubricating oil and petrolatum approximating three-fourths of the composition, unsaponified saponifiable fatty acids approximating 8% to 10% of the composition, calcium soap in the order of 12% to 15% of the composition, a wool fat in the order of about 4% of the composition.

MARCELLUS T. FLAXMAN.